(12) United States Patent
Kasar

(10) Patent No.: US 11,789,276 B1
(45) Date of Patent: Oct. 17, 2023

(54) HEAD-MOUNTED DEVICE WITH PIVOTING CONNECTORS

(71) Applicant: Darshan R. Kasar, San Francisco, CA (US)

(72) Inventor: Darshan R. Kasar, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 166 days.

(21) Appl. No.: 17/194,488

(22) Filed: Mar. 8, 2021

Related U.S. Application Data

(60) Provisional application No. 63/005,802, filed on Apr. 6, 2020.

(51) Int. Cl.
*G02B 27/01* (2006.01)
*F16M 13/04* (2006.01)

(52) U.S. Cl.
CPC ......... *G02B 27/0176* (2013.01); *F16M 13/04* (2013.01); *F16M 2200/021* (2013.01); *G02B 2027/0154* (2013.01)

(58) Field of Classification Search
CPC ............ G02B 27/0176; G02B 27/0149; G02B 2027/0154; G02B 27/0179; H01R 13/6205; H04R 5/0335
USPC .......................................................... 224/181
See application file for complete search history.

(56) References Cited

U.S. PATENT DOCUMENTS

| | | | | |
|---|---|---|---|---|
| 6,457,179 | B1* | 10/2002 | Prendergast | A42B 3/042 2/6.2 |
| 7,190,330 | B2* | 3/2007 | Travers | G02B 27/0176 345/7 |
| 7,225,471 | B2* | 6/2007 | Sutter | G02B 23/125 2/424 |
| 8,028,344 | B2* | 10/2011 | Rogers | A42B 3/0406 2/6.2 |
| 9,733,482 | B2* | 8/2017 | West | G02B 27/0179 |
| 10,321,751 | B1* | 6/2019 | Magrath | G06F 1/1686 |
| 10,324,296 | B2* | 6/2019 | Mitani | G02B 27/0172 |

(Continued)

FOREIGN PATENT DOCUMENTS

| | | |
|---|---|---|
| CN | 103877726 A | 6/2014 |
| CN | 105807425 A | 7/2016 |

(Continued)

*Primary Examiner* — Adam J Waggenspack
(74) *Attorney, Agent, or Firm* — Young Basile Hanlon & MacFarlane, P.C.

(57) ABSTRACT

A head-mounted device includes a device housing and a headband that is configured to support the device housing with respect to the user. A first connector part is connected to the headband, wherein the first connector part includes a first electrical connector portion. A second connector part is connected to the device housing, wherein the second connector part includes a second electrical connector portion. The first connector part and the second connector part are movable between a connected position, in which the first electrical connector portion is in engagement with the second electrical connector portion, and a disconnected position, in which the first connector part is spaced from the second connector part and the first electrical connector portion is not in engagement with the second electrical connector portion. The headband is able to rotate with respect to the device housing in the connected position.

21 Claims, 14 Drawing Sheets

(56) References Cited

U.S. PATENT DOCUMENTS

| | | | |
|---|---|---|---|
| 10,609,967 B2 * | 4/2020 | Reiter | H01R 13/627 |
| 10,660,224 B2 * | 5/2020 | Wen | G02C 3/003 |
| 10,663,737 B1 * | 5/2020 | Magrath | G02B 27/0176 |
| 11,089,954 B2 * | 8/2021 | Jackson | A61B 3/022 |
| 11,172,717 B2 * | 11/2021 | Reiter | H01R 13/6205 |
| 2016/0054571 A1 * | 2/2016 | Tazbaz | G02B 27/0176 |
| | | | 359/630 |
| 2018/0364766 A1 * | 12/2018 | Mendoza | G02B 27/017 |
| 2019/0227328 A1 | 7/2019 | Coatney | |
| 2021/0003270 A1 * | 1/2021 | Lee | H01R 11/30 |

FOREIGN PATENT DOCUMENTS

| | | |
|---|---|---|
| CN | 205750111 U | 11/2016 |
| CN | 206224049 U | 6/2017 |
| CN | 207440422 U | 6/2018 |

\* cited by examiner

HEAD-MOUNTED DEVICE WITH PIVOTING CONNECTORS

CROSS-REFERENCE TO RELATED APPLICATIONS

This application claims the benefit of U.S. Patent Application No. 63/005,802, filed on Apr. 6, 2020, the content of which is hereby incorporated by reference in its entirety for all purposes.

FIELD

The present disclosure relates generally to the field of head-mounted devices.

BACKGROUND

Computer-generated reality content may be presented to a user by a variety of devices, including handheld devices that are held by the user and head-mounted devices that are worn by the user on their head. These devices typically track the position and/or orientation of the device, and generate and present the content in accordance with the tracked position and/or orientation of the device. When computer-generated reality content is displayed to a user by a head-mounted device, the device is often supported by user's head. Examples of support structures that have been used for this purpose include helmets, eyeglass-type frames, rigid headbands, and flexible headbands.

SUMMARY

One aspect of the disclosure is a head-mounted device that includes a device housing and a headband that is configured to support the device housing with respect to the user. A first connector part is connected to the headband, wherein the first connector part includes a first electrical connector portion. A second connector part is connected to the device housing, wherein the second connector part includes a second electrical connector portion. The first connector part and the second connector part are movable between a connected position, in which the first electrical connector portion is in engagement with the second electrical connector portion, and a disconnected position, in which the first connector part is spaced from the second connector part and the first electrical connector portion is not in engagement with the second electrical connector portion. The headband is able to rotate with respect to the device housing in the connected position.

In some implementations of the head-mounted device, the first connector part includes a connector body, the first electrical connector portion is fixed to the connector body, the first connector part includes a bearing ring, the bearing ring is fixed to the headband, and the bearing ring is rotatable with respect to the connector body to allow the headband to rotate with respect to the device housing.

In some implementations of the head-mounted device, the connector body has a circular periphery that defines a peripheral surface, and the bearing ring extends round the peripheral surface of the connector body.

In some implementations of the head-mounted device, the first connector part includes a locking structure, the locking structure is connected to the connector body, the locking structure is movable between a locked position and an unlocked position, the locking structure is engaged with the second connector part to prevent disengagement of the connector body from the second connector part in the locked position, and the locking structure does not prevent disengagement of the connector body from the second connector part in the unlocked position.

In some implementations of the head-mounted device, the first connector part includes a release button that, when operated, moves the locking structure from the locked position to the unlocked position.

In some implementations of the head-mounted device, the first connector part includes a release mechanism that moves the locking structure from the locked position to the unlocked position in response to rotation of the headband with respect to the device housing.

In some implementations of the head-mounted device, the release mechanism moves to the unlocked position from the locked position upon rotation of the headband by a predetermined angle relative to a use position.

In some implementations of the head-mounted device, the first connector part includes a rotating joint that allows rotation of the first electrical connector portion with respect to the headband.

In some implementations of the head-mounted device, the rotating joint includes a detent that corresponds to a use position and resists rotation away from the use position.

In some implementations of the head-mounted device, the first connector part includes first magnetic components, the second connector part includes second magnetic components, and magnetic attraction between the first magnetic components and the second magnetic components urges the first connector part toward engagement with the second connector part.

In some implementations of the head-mounted device, the first connector part includes first magnetic components, the second connector part includes second magnetic components, and magnetic attraction between the first magnetic components and the second magnetic components urges the first connector part toward a predetermined angular orientation of the headband relative to the device housing.

In some implementations, the head-mounted device includes a display device that is connected to the device housing and generates emitted light to display content, and optical components that are associated with the display device to direct the emitted light to the eyes of the user.

Another aspect of the disclosure is a head-mounted device that includes a device housing, a near-eye display system that is connected to the device housing, and a headband that is configured to support the device housing with respect to a user. A first connector part is connected to the headband, wherein the first connector part includes a mechanical connector portion and a rotating joint. The mechanical connector portion is connected to the headband by the rotating joint so that the headband is able to rotate with respect to the mechanical connector portion of the first connector part. A second connector part is connected to the device housing. The first connector part and the second connector part are movable between a connected position and a disconnected position.

In some implementations of the head-mounted device, the mechanical connector portion of the first connector part is in engagement with the second connector part in the connected position and the mechanical connector portion of the first connector part is not in engagement with the second connector part in the disconnected position.

In some implementations of the head-mounted device, the mechanical connector portion of the first connector part is not rotatable with respect to the second connector part in the connected position, the headband is rotatable with respect to the device housing in the connected position, and the second connector part is not rotatable with respect to the device housing.

In some implementations of the head-mounted device, the first connector part includes a first electrical connector portion that is connected to the mechanical connector portion, the second connector part includes a second electrical connector portion, and the first electrical connector portion is engaged with the second electrical connector portion in the connected position to establish an electrical connection between the first electrical connector portion and the second electrical connector portion.

Another aspect of the disclosure is a head-mounted device that includes a device housing, a near-eye display system that is connected to the device housing and a headband that is configured to support the device housing with respect to a user. A first connector part is connected to the headband and includes first magnetic components. A second connector part is connected to the device housing and includes second magnetic components. The first connector part and the second connector part are movable from a disconnected position to a connected position to define a rotatable connection between the device housing and the headband in the connected position. Magnetic attraction between the first magnetic components and the second magnetic components urges the first connector part toward a predetermined angular orientation of the headband relative to the device housing.

In some implementations of the head-mounted device, the first connector part includes a first electrical connector portion, the second connector part includes a second electrical connector portion, and the first electrical connector portion is engaged with the second electrical connector portion in the connected position to establish an electrical connection between the first electrical connector portion and the second electrical connector portion.

In some implementations of the head-mounted device, the first connector part includes a locking structure, the locking structure is movable between a locked position and an unlocked position, the locking structure is engaged with the second connector part to prevent disengagement of the first connector part from the second connector part in the locked position, and the locking structure does not prevent disengagement of the first connector part from the second connector part in the unlocked position.

In some implementations of the head-mounted device, the first connector part includes a release mechanism that, when operated, moves the locking structure from the locked position to the unlocked position.

DETAILED DESCRIPTION

The disclosure herein relates to head-mounted devices that are used to show computer-generated reality (CGR) content to users. The devices that are described herein includes a headband that can be connected to and disconnected from a device housing by pivoting connectors that accommodate electrical and structural connections. The pivoting connectors include connector parts allow the headband to be rotated with respect to the device housing while in the connected position. In some implementations, the connector parts include electrical connector parts that do not rotate when the headband rotates with respect to the device housing.

Figure 1:
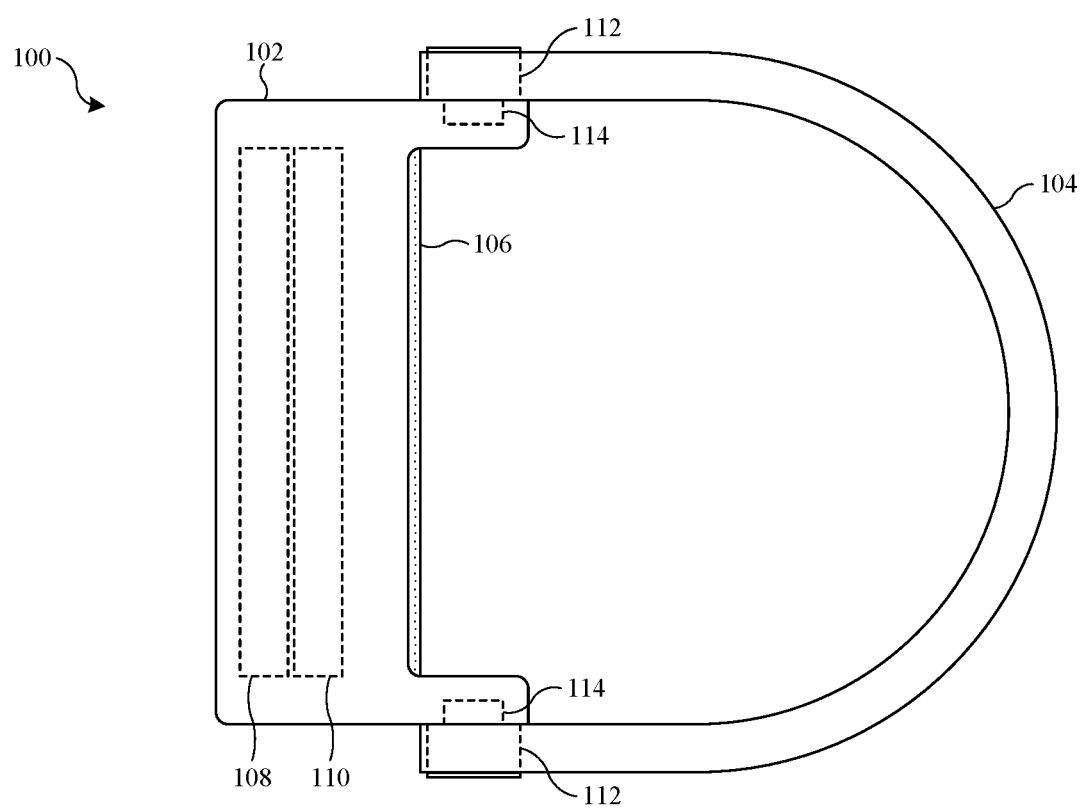
FIG. 1 is a top view illustration that shows a head-mounted device that includes a device housing and a headband in a connected position.
Figure 2:
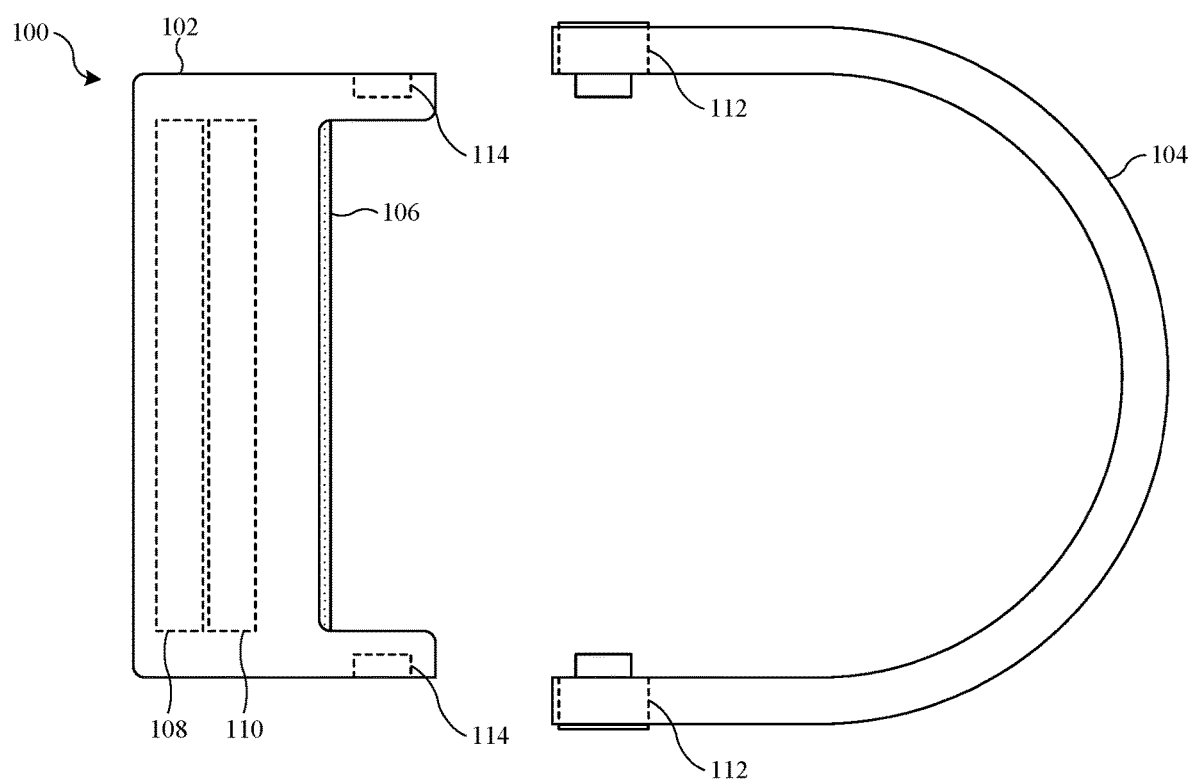
FIG. 2 is a top view illustration that shows the head-mounted device with the headband in a disconnected position.

FIG. 1 is a top view illustration that shows a head-mounted device 100 that includes a device housing 102 and a headband 104 in a connected position, and FIG. 2 is a top view illustration that shows the head-mounted device 100 with the headband 104 in a disconnected position.

The head-mounted device 100 is intended to be worn on the head of a user and includes components that are configured to display content to the user. Components that are included in the head-mounted device 100 may be configured to track motion of parts of the user's body, such as the user's head and hands. Motion tracking information that is obtained by components of the head-mounted device can be utilized as inputs that control aspects of the generation and display of the content to the user, so that the content displayed to the user can be part of a CGR experience in which the user is able to view and interact with virtual environments and virtual objects. As will be explained further herein, CGR experiences include display of computer-generated content independent of the surrounding physical environment (e.g., virtual reality), and display of computer generated content that is overlaid relative to the surrounding physical environment (e.g., augmented reality).

In the illustrated example, the head-mounted device 100 includes the device housing 102, the headband 104, a facial interface 106, electronic components 108, and optical components 110. The headband 104 is connected to the device housing 102 by pivoting connectors formed by connection of first connector parts 112 that are located on the headband 104 with second connector parts 114 that are formed on the device housing 102.

The device housing 102 is a structure that is intended to be positioned near the user's eyes when in use. Components responsible for the display of CGR content may be located in the device housing 102, such as the electronic components 108 and the optical components 110. The device housing 102 may have a size and shape that corresponds generally to the width of an average person's head. The device housing 102 may have a height that corresponds generally to the distance between an average person's forehead and cheek bones such that part of the device housing 102 is located above the user's orbital cavities and part of the device housing 102 is located below the user's orbital cavities when the head-mounted device 100 is worn. As one example, the device housing 102 may be a frame that components are connected to. As another example, the device housing 102 may be a structure such encloses other components such as the electronic components 108 and the optical components 110. In some implementations, the device housing 102 may be an eyeglasses style frame.

The headband 104 is a component or collection of components that function to secure the device housing 102 in place with respect to the user's head so that the device housing 102 is restrained from moving with respect to the user's head and maintains a comfortable position during use. The headband 104 may include one or more components that extend around the user's head, such as by encircling the user's head. The headband 104 may include rigid structures, flexible structures, or a combination of rigid structures and flexible structures. As examples, the headband 104 may include rigid band portions, elastic flexible band portions, inelastic flexible band portions, silicone band portions, and/or other structures.

The headband 104 is connected to the device housing 102 by the first connector parts 112 and the second connector parts 114, as will be explained further herein.

The facial interface 106 is connected to the device housing 102 and is located at areas around a periphery of the device housing 102 where contact with the user's face is likely. The facial interface 106 may contact areas of the user's face, such as the user's forehead, temples, and cheeks. The facial interface 106 may be formed from a resilient material and compressible so that it is able to conform to portions of the user's face to allow the headband 104 to be tightened appropriately. Examples of suitable materials include as open-cell foam and closed cell foam. The facial interface 106 may also function to reduce the amount of light from the physical environment around the user that reaches the user's eyes. In some implementations, the facial interface 106 is omitted, for example, when not necessary because of the configuration of the device housing 102 or because of the configuration of other portions of the head-mounted device 100.

The electronic components 108 include devices that cause content to be output for display to the user. The electronic components 108 may include computing devices that are able to generate content (e.g., by rendering a three-dimensional scene using program instructions and other assets) and/or playback previously recorded content. The electronic components may also include display components, such as a display screen that emits light in order to display the content (e.g., according to color values for pixels). The electronic components may also include sensors, input devices, other output devices, and or other components that may be used in support of or in conjunction with the display of CGR content to the user.

Figure 3:
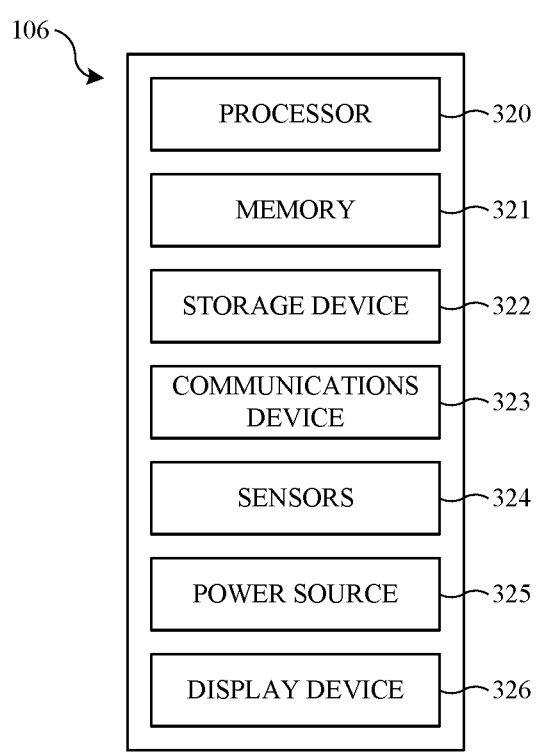
FIG. 3 is an illustration that shows an example of an implementation of electronic components of the head-mounted device.

FIG. 3 is an illustration that shows an example of an implementation of the electronic components 108 of the head-mounted device 100. In the illustrated example, the electronic device includes a processor 320

The processor 320 is a device that is operable to execute computer program instructions and is operable to perform operations that are described by the computer program instructions. The processor 320 may be implemented using one or more conventional devices and/or more or more special-purpose devices. As examples, the processor 320 may be implemented using one or more central processing units, one or more graphics processing units, one or more application specific integrated circuits, and/or one or more field programmable gate arrays. The processor 320 may be provided with computer-executable instructions that cause the processor 320 to perform specific functions. The memory 321 may be one or more volatile, high-speed, short-term information storage devices such as random-access memory modules.

The storage device 322 is intended to allow for long term storage of computer program instructions and other data. Examples of suitable devices for use as the storage device 322 include non-volatile information storage devices of various types, such as a flash memory module, a hard drive, or a solid-state drive.

The communications device 323 supports wired or wireless communications with other devices. Any suitable wired or wireless communications protocol may be used.

The sensors 324 are components that are incorporated in the head-mounted device 100 to generate sensor output signals to are used as inputs by the processor 320 for use in generating CGR content and controlling tension, as will be described herein. The sensors 324 include components that facilitate motion tracking (e.g., head tracking and optionally handheld controller tracking in six degrees of freedom). The sensors 324 may also include additional sensors that are used by the device to generate and/or enhance the user's experience in any way. The sensors 324 may include conventional components such as cameras, infrared cameras, infrared emitters, depth cameras, structured-light sensing devices, accelerometers, gyroscopes, and magnetometers. The sensors 324 may also include biometric sensors that are operable to physical or physiological features of a person, for example, for use in user identification and authorization. Biometric sensors may include fingerprint scanners, retinal scanners, and face scanners (e.g., two-dimensional and three-dimensional scanning components operable to obtain image and/or three-dimensional surface representations). Other types of devices can be incorporated in the sensors 324. The information that is generated by the sensors 324 is provided to other components of the head-mounted device 100, such as the processor 320, as inputs.

The power source 325 supplies electrical power to components of the head-mounted device 100. In some implementations, the power source 325 is a wired connection to electrical power. In some implementations, the power source 325 may include a battery of any suitable type, such as a rechargeable battery. In implementations that include a battery, the head-mounted device 100 may include components that facilitate wired or wireless recharging.

The display device 326 is connected to the device housing 102 and functions to display content to the user in the form of emitted light that is output by the display device 326 and is directed toward the user's eyes by the optical components 110. The display device 326 is a light-emitting display device, such as a video display of any suitable type, that is able to output images in response to a signal that is received from the processor 320. The display device 326 may be of the type that selectively illuminates individual display elements according to a color and intensity in accordance with pixel values from an image. As examples, the display device may be implemented using a liquid-crystal display (LCD) device, a light-emitting diode (LED) display device, a liquid crystal on silicon (LCoS) display device, an organic light-emitting diode (OLED) display device, or any other suitable type of display device. The display device 326 may include multiple individual display devices (e.g., two display screens or other display devices arranged side-by-side in correspondence to the user's left eye and the user's right eye).

Together, the electronic components 108 and the optical components 110 cooperate to define a near-eye display system. The term near-eye display system refers to a device that displays content so that it can be seen by a user through components (e.g., lenses) that are positioned near (e.g., within ten centimeters) the eyes of the user. The term near-eye display includes devices that display content in correspondence with the angular orientation of the device and devices that display content without correspondence to the angular orientation of the device.

In some implementations of the head-mounted device 100, some or all of the electronic components 108 may be included in a separate device. As an example, any or all of the processor 320, the memory 321, and/or the storage device 322, the communications device 323, the sensors 324, the power source 325, and the display device 326 may be incorporated in a device such as a smart phone that is connected (e.g., by docking) to the other portions of the head-mounted device 100 and is removable from the head-mounted device 100.

In some implementations of the head-mounted device 100, the processor 320, the memory 321, and/or the storage device 322 are omitted, and the corresponding functions are performed by an external device that communicates with the head-mounted device 100. In such an implementation, the head-mounted device 100 may include components that support a data transfer connection with the external device using a wired connection or a wireless connection that is established using the communications device 323.

With further reference to FIGS. 1-2, the optical components 110 are configured to direct light emitted by the electronic components 108 to the user's eyes. The optical components 110 are connected to the device housing 102 such that portions of the optical components 110 (e.g., lenses) are positioned adjacent to the user's eyes. The optical components 110 direct the emitted light from the display device 326 to the user's eyes. In some implementations, the optical components 110 may be configured isolate the emitted light from environment light (e.g., as in a virtual reality type system), so that a scene perceived by the user is defined only by the emitted light and not by the environment light. In some implementations, the optical components 110 may be configured to combine the emitted light with environmental light so that the scene perceived by the user is defined by the emitted light and the environment light. In some implementations, the optical components 110 may combine the emitted light and the environment light so that a spatial correspondence is established between the emitted light and the environmental light to define the scene that is perceived by the user (e.g., as in an augmented reality type system). The optical components 110 may include lenses, reflectors, polarizers, filters, optical combiners, and/or other optical components.

The headband 104 is connected to the device housing 102 by the first connector parts 112 and the second connector parts 114. The first connector parts 112 and the second connector parts 114 define a pivoting structural connection of the headband 104 to the device housing 102. The first connector parts 112 and the second connector parts 114 also include an electrical connection between components located in the device housing 102 and components located in the headband 104 to allow exchange of signals, data, and/or electrical power between the device housing 102 and the headband 104.

The first connector parts 112 and the second connector parts 114 allow the headband 104 to be connected to and disconnected from the device housing 102 to define a connected position (FIG. 1) and a disconnected position (FIG. 2). In the connected position, the device housing 102 and the headband 104 are connected to one another by engagement of the first connector parts and 112 and the second connector parts 114. In the disconnected position, the device housing 102 and the headband 104 are separated from one another and the first connector parts and 112 are disengaged from the second connector parts 114.

The first connector parts 112 and the second connector parts 114 also allow the headband 104 to be pivoted with respect to the device housing 102 while the headband 104 is in the connected position with respect to the device housing 102.

The first connector parts 112 may be provided in a pair, with one at each end of the headband 104. The second connector parts 114 may also be provided in a pair, with the first one located on a first lateral side (e.g., the right side) of the device housing 102 and with the second one located on a second lateral side (e.g., the left side) of the device housing 102.

Figure 4:
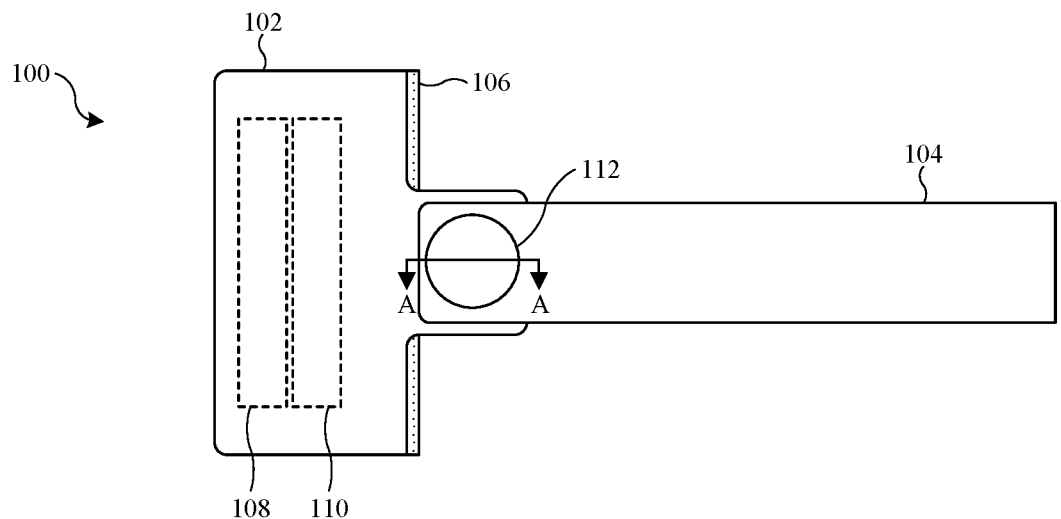
FIG. 4 is a side view illustration that shows the head-mounted device with the headband in a first angular orientation with respect to the device housing.

FIG. 4 is a side view illustration that shows the head-mounted device 100 with the headband 104 in a first angular orientation with respect to the device housing 102. The first angular orientation is a typical use position, in which the headband 104 is oriented such that it may encircle the user's head. As viewed from the side, as in FIG. 4, the headband 104 extends in a direction that is substantially parallel to a direction of the optical axes defined by the optical components 110 for the user's right and left eyes.

Figure 5:
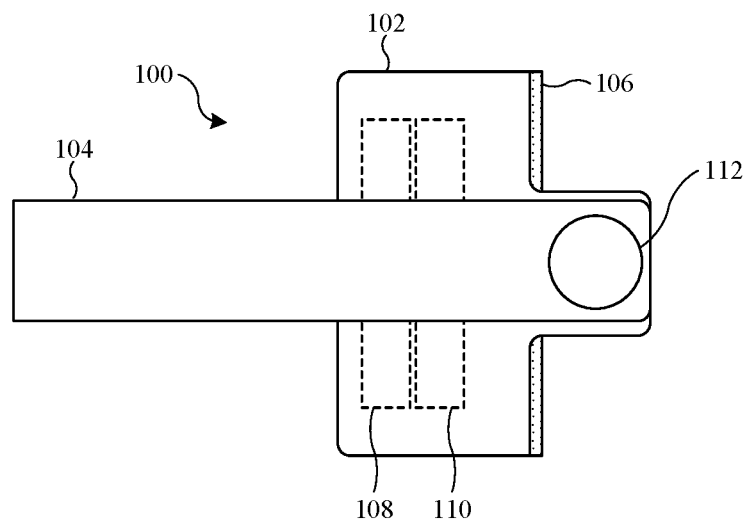
FIG. 5 is a side view illustration that shows the head-mounted device with the headband in a second angular orientation with respect to the device housing.

FIG. 5 is a side view illustration that shows the head-mounted device with the headband 104 in a second angular orientation with respect to the device housing 102. In the second angular orientation, the headband 104 is rotated approximately one-hundred and eighty degrees relative to the use position (first angular orientation) that is shown in FIG. 4, so that part of the headband 104 is positioned forward relative to the forward-most part of the device housing.

Figure 6:
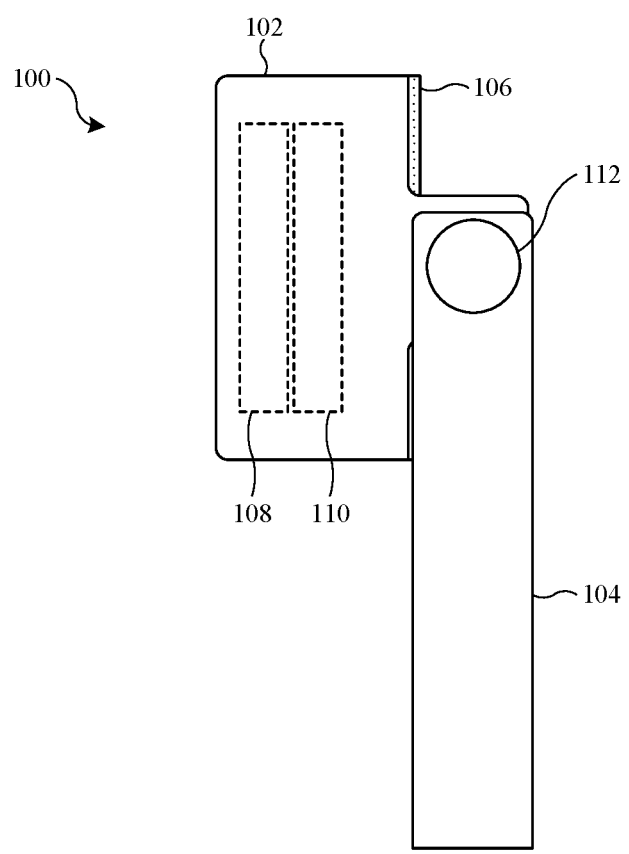
FIG. 6 is a side view illustration that shows the head-mounted device with the headband in a third angular orientation with respect to the device housing.

FIG. 6 is a side view illustration that shows the head-mounted device 100 with the headband 104 in a third angular orientation with respect to the device housing 102. In the third angular orientation, the headband 104 is rotated approximately ninety degrees relative to the use position that is shown in FIG. 4, so that part of the headband 104 extends downward from the device housing 102.

In addition to the configurations shown in FIGS. 4-6, other angular orientations may be established between the device housing 102 and the headband 104. In some implementations, the angular orientations shown in FIGS. 4-6 and/or other angular orientations may be associated with detent positions that are defined by engagement of the first connector parts 112 of the headband 104 and the second connector parts 114 of the device housing 102.

Figure 7:
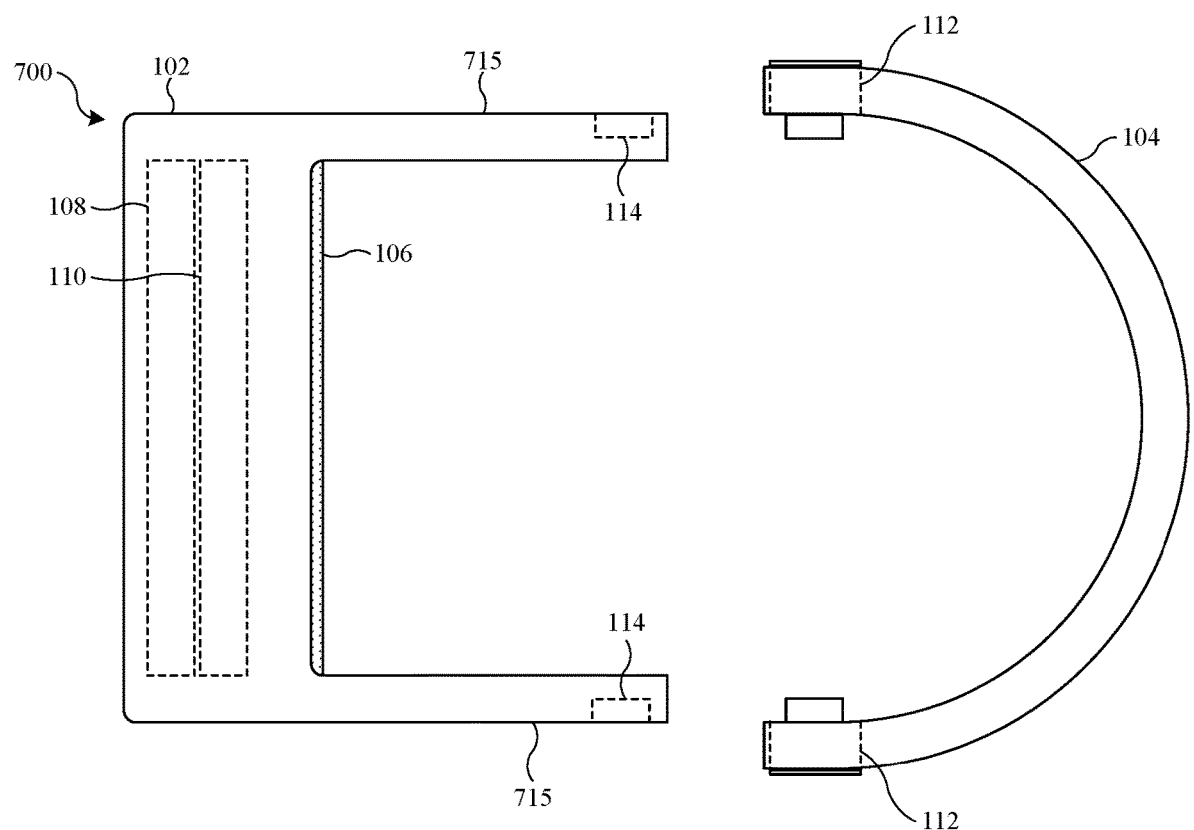
FIG. 7 is a top view illustration that shows an alternative implementation of the head-mounted device with the headband in a disconnected position.

FIG. 7 is a top view illustration that shows an alternative implementation 700 of the head-mounted device 100 with the headband 104 in a disconnected position. The alternative implementation 700 of the head-mounted device 100 includes all of the features of the head-mounted device 100 as previously described, except as described to the contrary herein.

The alternative implementation 700 of the head-mounted device 100 includes housing extensions 715 that are located near the sides of the device housing 102 and extend rearward from the device housing 102. As an example, the housing extensions 715 may be located adjacent to left and right sides of the user's head when the head-mounted device 100 is worn. The housing extensions 715 are integrally formed with and/or directly connected to the device housing 102 and are also connected to the headband 104 so that the headband 104 is connected to the device housing 102 indirectly, through the housing extensions 715. The housing extensions 715 may be rigid or semi-rigid structures. In addition to mechanical connections with the device housing 102 and the headband 104, the housing extensions 715 may include electrical connections with the device housing 102 and/or the headband 104. An accessory component may be located in one of the housing extensions 715 and be electrically connected to components that are located in the device housing 102 and/or the headband 104. As examples, the accessory component may be or include a battery pack, a sensor, an input device (e.g., a button or a microphone), an output device (e.g., a display, a status light, a projector, a loudspeaker), an interface device (e.g., allowing wired connections to external devices), or other type of component.

In the alternative implementation 700 of the head-mounted device 100, the second connector parts 114 are formed on the housing extensions 715 instead of being formed on the device housing 102. The first connector parts 112 and the second connector parts 114 otherwise function in the manner previously described and as will be further described herein. Thus, in the alternative implementation 700, the second connector part 114 is connected to the device housing, wherein the second connector part is formed on the housing extension 715 so that the second connector part is indirectly connected to the device housing 102 by the housing extension 715.

Because the housing extensions 715 extend rearward from the device housing 102, the second connector parts 114 can be located rearward relative to the device housing 102 in the front-to-rear direction, as opposed to the second connector parts 114 being located on the device housing 102 either forward from or slightly rearward from the facial interface 106. Thus, the second connector parts 114 may be located rearward from the facial interface 106. This may, for example place the rotation point for the headband 104 adjacent to the user's ears and/or rearward of the user's ears when the head-mounted device 100 is worn.

In the illustrated example in FIG. 7, the second connector parts 114 are located on the outside surfaces (away from the user) of the housing extensions 715 and the first connector parts 112 on the headband 104 are located outward relative to the housing extensions 715 and the second connector parts 114. In an alternative configuration, the second connector parts 114 are located on the inside surfaces (toward from the user) of the housing extensions 715 and the first connector parts 112 on the headband 104 are located inward relative to the housing extensions 715 and the second connector parts 114.

Figure 8:
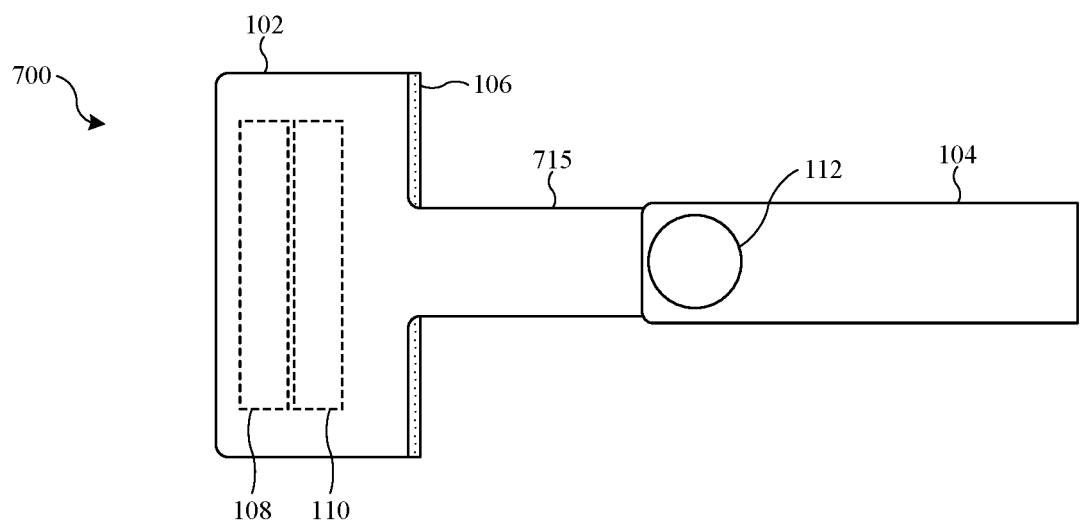
FIG. 8 is a side view illustration that shows the alternative implementation of the head-mounted device with the headband in a first angular orientation with respect to the device housing.

FIG. 8 is a side view illustration that shows the alternative implementation 700 of the head-mounted device 100 with the headband 104 in a first angular orientation with respect to the device housing 102 and the housing extension 715. The first angular orientation is a typical use position, in which the headband 104 is oriented such that it may encircle the user's head. As viewed from the side, as in FIG. 4, the headband 104 extends in a direction that is substantially parallel to a direction of the optical axes defined by the optical components 110 for the user's right and left eyes.

Figure 9:
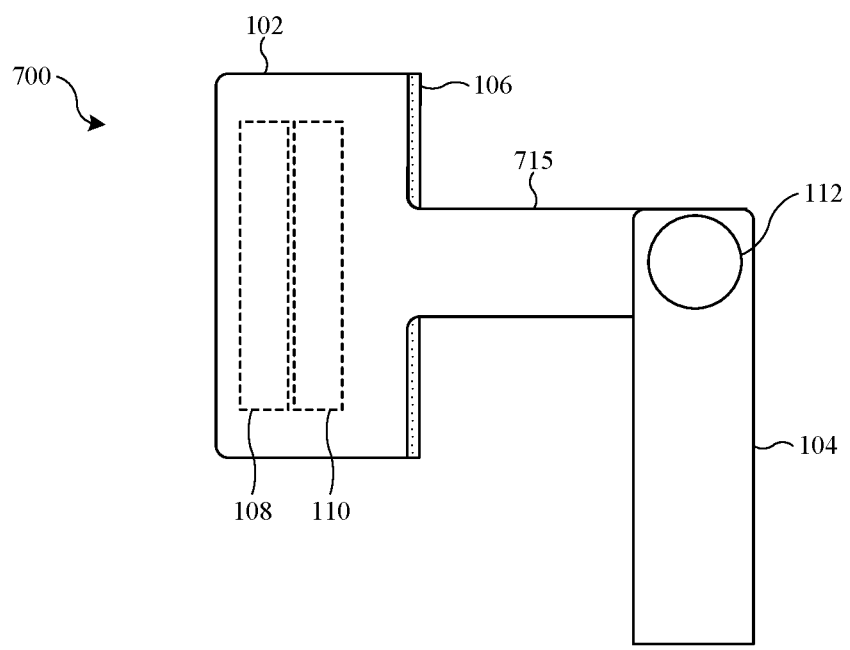
FIG. 9 is a side view illustration that shows the alternative implementation of the head-mounted device with the headband in a second angular orientation with respect to the device housing.

FIG. 9 is a side view illustration that shows the alternative implementation 700 of the head-mounted device 100 with the headband 104 in a second angular orientation with respect to the device housing 102 and the housing extension 715. In the second angular orientation, the headband 104 is rotated approximately ninety degrees relative to the use position that is shown in FIG. 8, so that part of the headband 104 extends downward from the device housing 102 and the housing extension 715.

In addition to the configurations shown in FIGS. 8-9, other angular orientations may be established between the device housing 102 and the headband 104 for the alternative implementation 700 of the head-mounted device 100. In some implementations, the angular orientations shown in FIGS. 8-9 and/or other angular orientations may be associated with detent positions that are defined by engagement of the first connector parts 112 and the second connector parts 114.

Figure 10:
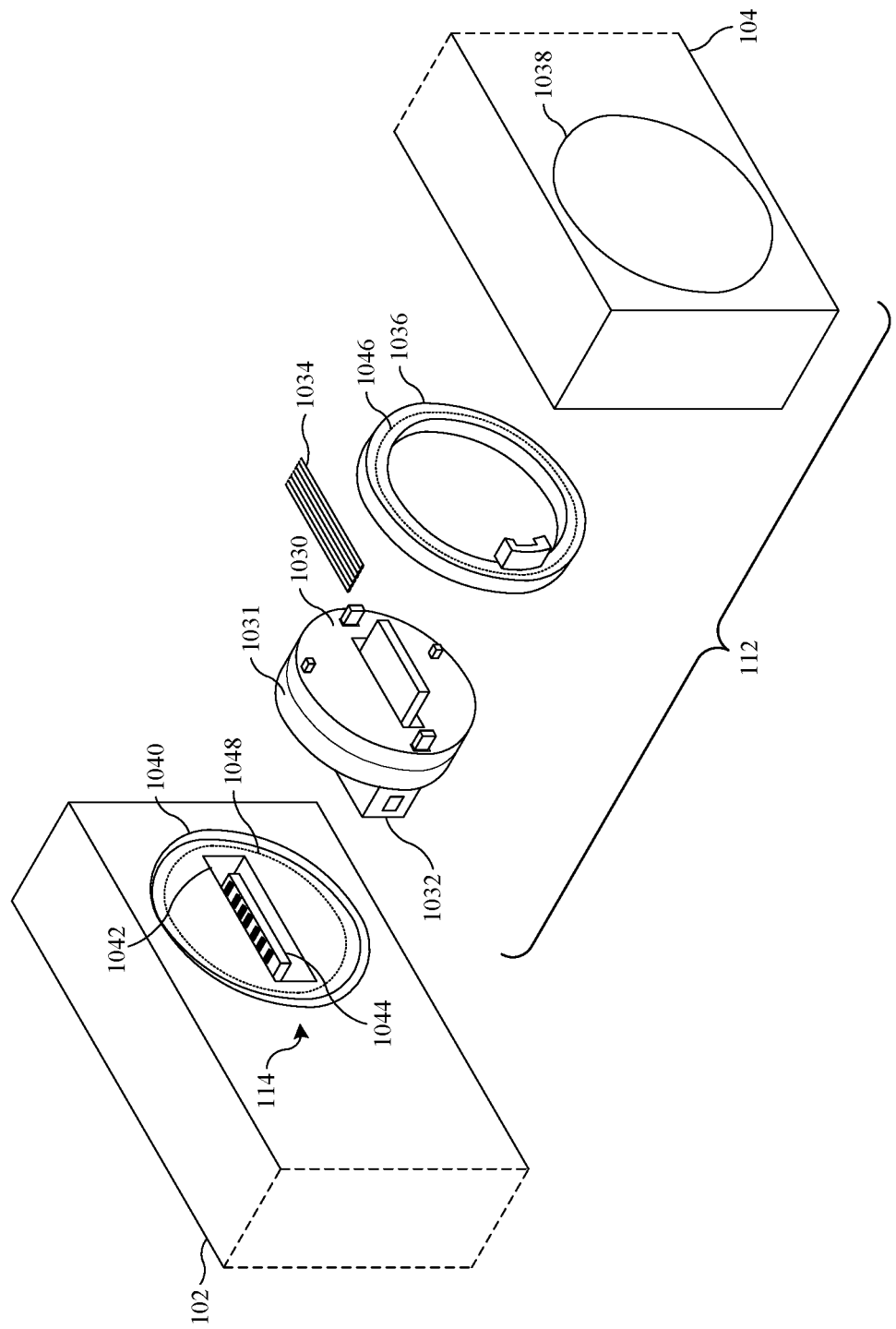
FIG. 10 is an exploded perspective that shows a first connector part and a second connector part.

FIG. 10 is an exploded perspective view showing the first connector part 112 and the second connector part 114. The first connector part 112 is formed on and/or connected to the headband 104 and includes a connector body 1030, a first electrical connector portion 1032, a wiring harness portion 1034, a bearing ring 1036, and a release button 1038. The second connector part 114 is formed on and/or connected to the device housing 102 and includes a receiver area 1040, a recess 1042, and a second electrical connector portion 1044.

The connector body 1030 is the portion of the first connector part 112 that directly connects to the second connector part 114 to establish a mechanical connection between the device housing 102 and the headband 104. Thus, the connector body 1030 serves as a mechanical connector portion of the first connector part 112. In the illustrated example, the connector body 1030 has a first portion (i.e., a cylindrical portion) with a generally cylindrical configuration and a circular outer periphery that defines a peripheral surface 1031. As will be explained, the peripheral surface 1031 provides a bearing surface on which the bearing ring 1036 is mounted for rotation around the first portion of the connector body. In the illustrated example, the connector body 1030 also has a second portion (i.e., a plug portion) that is a plug-like element that is configured to be inserted in to the second connector part 114 to define the mechanical connection of the first connector part 112 to the second connector part 114.

The first connector part 112 includes the first electrical connector portion 1032, which is connected to the connector body 1030 in a fixed manner (i.e., the first electrical connector portion 1032 is fixed to the connector body 1030). As an example, the first electrical connector portion may be located on and/or in the second, plug-like portion of the connector body so that the first electrical connector portion 1032 is inserted into the second connector part 114 in the connected position. The first electrical connector portion 1032 is not rotatable with respect to the connector body 1030.

The wiring harness portion 1034 serves to connect the first electrical connector portion 1032 to one or more electronic components that are located in the headband 104. Thus, the wiring harness portion 1034 is connected to the first electrical connector portion 1032. In the connected position the wiring harness portion 1034 will move with the headband 104 and therefore part of the wiring harness portion 1034 will rotate with respect to the first electrical connector portion 1032. This rotation may be accommodated using a number of different connection designs. For example, the wiring harness portion 1034 may be directly connected to the first electrical connector portion 1032 by a pin-type connector plug or by soldering, with part of the wiring harness portion 1034 being configured in a service loop around an axis of rotation of the headband to allow the service loop to wind and unwind as the headband 104 is rotated. As another example, electrical connectors with relatively moving parts may be used, such as an arrangement of concentric contacts, pins that ride along tracks during rotation, electrical contacts located on an axle at a center of rotation, and/or other connector structures.

The first connector part 112 includes the bearing ring 1036, which is connected to the headband 104 in a fixed manner so that the bearing ring 1036 cannot move with respect to the headband 104. In the illustrates example, the bearing ring 1036 is a separate component, but in alternative implementations, the bearing ring could be formed as an integral part of the headband 104. The bearing ring 1036 is rotatably connected to the connector body 1030 and functions to connect the connector body 1030 to the headband 104 in a manner that allows for rotation of the headband 104 with respect to the connector body 1030 and the first electrical connector portion 1032. Thus, the bearing ring 1036 is rotatable with respect to the connector body 1030 to allow the headband 104 to rotate with respect to the device housing 102.

The bearing ring 1036 is an annular structure that includes an inner periphery and an outer periphery. The inner periphery of the bearing ring 1036 extends around an opening. The size of the opening corresponds to the size of the cylindrical portion of the connector body 1030. As assembled, the bearing ring 1036 extends round the peripheral surface 1031 of the connector body 1030. This arrangement of the bearing ring 1036 with respect to the connector body 1030 supports the connector body 1030 for rotation relative to the headband 104. The bearing ring 1036 and connector body 1030 may additionally include features (e.g., such as complementary projections and grooves) that prevent the connector body 1030 from moving axially away from the bearing ring 1036 and the headband 104.

Thus, the connector body 1030 and the bearing ring 1036 define a rotating joint that allows rotation of the connector body 1030 with respect to the headband and that allows rotation of the first electrical connector portion 1032 with respect to the headband 104. The rotating joint may include a detent 1150 (FIG. 11) that corresponds to the use position (FIG. 4) of the headband 104 and resists rotation away from the use position.

The second connector part 114 is formed on and/or connected to the device housing 102. The second connector part 114 and its constituent components are fixed to the device housing 102. For example, the second connector part 114 may be connected to the device housing 102 such that the second connector part 114 is not rotatable with respect to the device housing 102.

The second connector part includes the receiver area 1040, the recess 1042, and the second electrical connector portion 1044. The receiver area 1040 is an area that is located on the device housing 102, and may be depressed so that a portion of the connector body 1030 and/or the bearing ring 1036 is located in the receiver area when first connector part 112 is connected to the second connector part 114. The recess 1042 is an opening into to which a portion of the first connector part 112, such as the plug portion of the connector body 1030, can be inserted into the second connector part 114 to define the connected position. The second electrical connector portion 1044 is an electrical connector (e.g., including electrical contacts), that is electrically connectable to the first electrical connector portion 1032.

The first connector part 112 and the second connector part 114 are movable between the connected position and the disconnected position. When in the connected position, a rotatable connection is defined between the device housing 102 and the headband 104. The connector body 1030 and the first electrical connector portion 1032 are fixed with respect to the second connector part 114 and the device housing 102 when in the connected position. While the first connector part 112 and the second connector part 114 allow rotation of the headband 104 relative to the device housing 102 in the connected position, this rotation occurs at the interface between the connector body 1030 and the bearing ring 1036, as previously described.

In the connected position, the first connector part 112 is in engagement with the second connector part 114. In particular, the first electrical connector portion 1032 is in engagement with the second electrical connector portion 1044 in the connected position to define and electrical connection between electronic components in the device housing 102 and electronic components in the headband 104, to allow the exchange of electrical power, signals, and/or data between such components.

In the disconnected position, the first connector part 112 is spaced from the second connector part 114 and the first electrical connector portion 1032 is not in engagement with the second electrical connector portion 1044.

The connected position is established by moving part of the first connector part 112 into engagement with the second connector part 114. As an example, moving the first connector part 112 and the second connector part 114 to the connected position may include inserting the plug portion of the connector body 1030 into the second connector part 114. To connect the first connector parts 112 at both ends of the headband 104 to the second connector parts at both lateral sides of the device housing 102, it may be necessary to flex, adjust, or otherwise manipulate the headband 104.

The first connector part 112 and the second connector part 114 may be moved to the disconnected position by moving them away from one another so that they are disengaged. In some implementations, a locking mechanism may be included to resist disconnection of the first connector part 112 and the second connector part 114. In such implementations, a release mechanism may be included. As one example, a release mechanism may be operated by the release button 1038 or may be operated by rotation of the headband 104 to a predetermined angular orientation relative to the device housing 102.

In some implementations, the first connector part 112 includes first magnetic components 1046 and the second connector part 114 includes second magnetic components 1048. In the illustrated example, the first magnetic components 1046 are located in the bearing ring 1036 of the first connector part 112 and the second magnetic components 1048 are located in the receiver area 1040 of the second connector part 114.

The first magnetic components 1046 and the second magnetic components 1048 are paired so that they are configured to generate a magnetic attraction force between them. As one example, pairs of first magnetic components 1046 and the second magnetic components 1048 may be a pair of magnets, a magnetic paired with a ferromagnetic structure, a pair of electromagnets, an electromagnet paired with a magnet, and/or an electromagnet paired with a ferromagnetic structure.

In some implementations, the first magnetic components 1046 and the second magnetic components 1048 are configured so that magnetic attraction between the first magnetic components 1046 and the second magnetic components 1048 urges the first connector part 112 toward engagement with the second connector part 114.

In some implementations, the first magnetic components 1046 and the second magnetic components 1048 are arranged in a pattern so that magnetic attraction between the first magnetic components 1046 and the second magnetic components 1048 urges the first connector part 112 toward a predetermined angular orientation of the headband 104 relative to the device housing 102.

Figure 11:
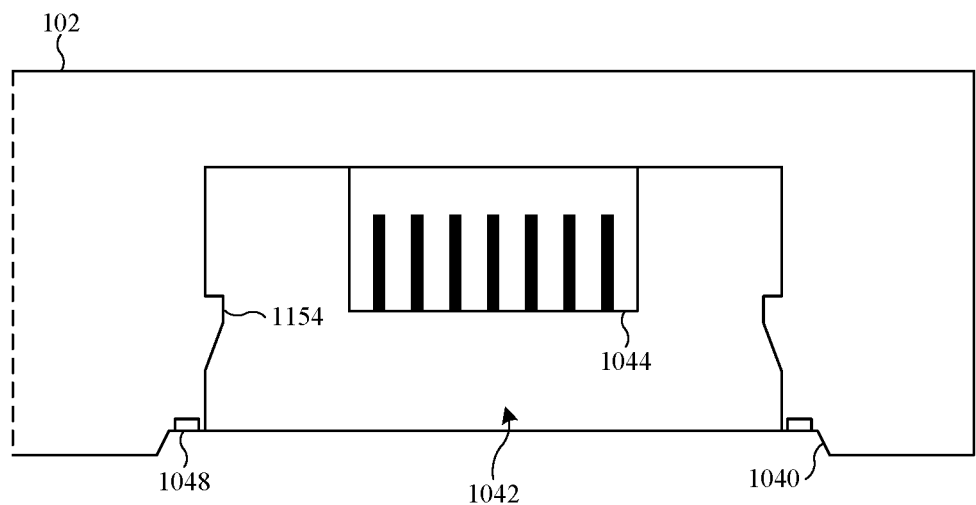
FIG. 11 is a cross-section view, taken along line A-A of FIG. 4, showing the first connector part and the second connector part in the disconnected position.
Figure 11:
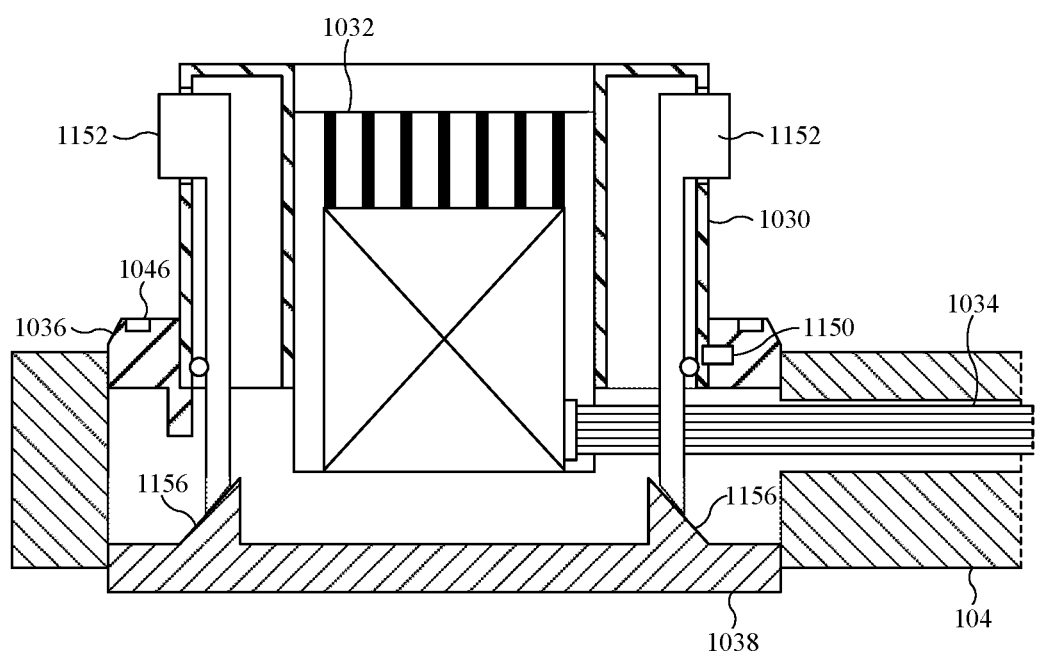
Figure 12:
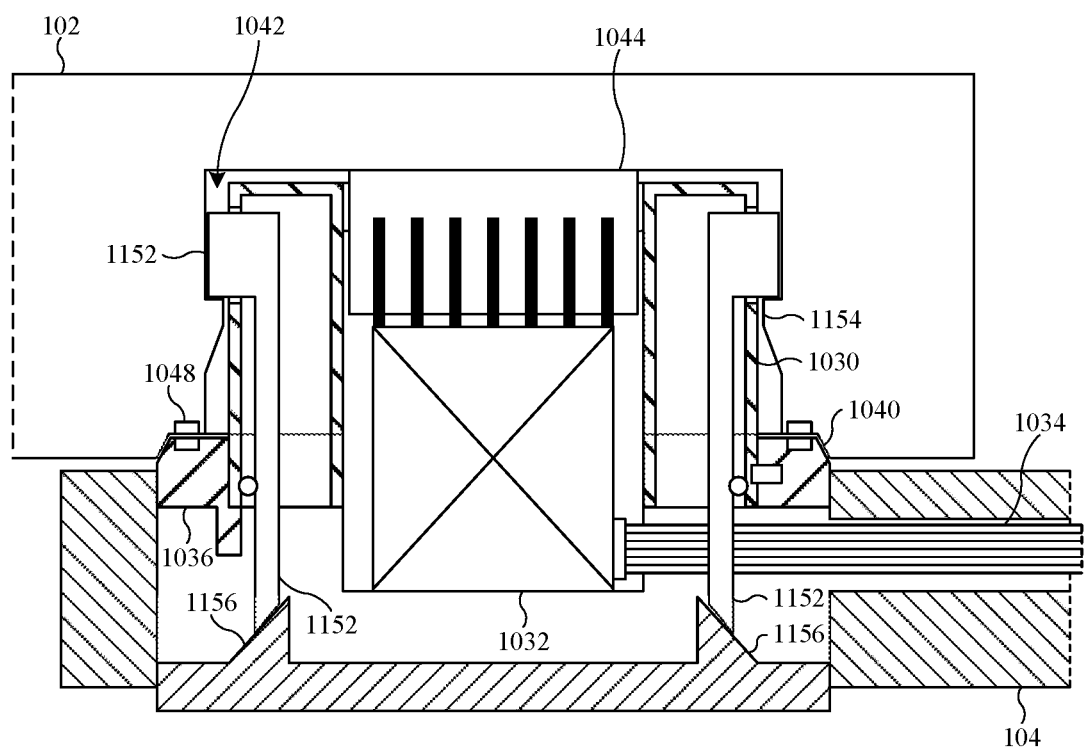
FIG. 12 is a cross-section view, taken along line A-A of FIG. 4, showing the first connector part and the second connector part in the connected position with a locking structure in a locked position.
Figure 13:
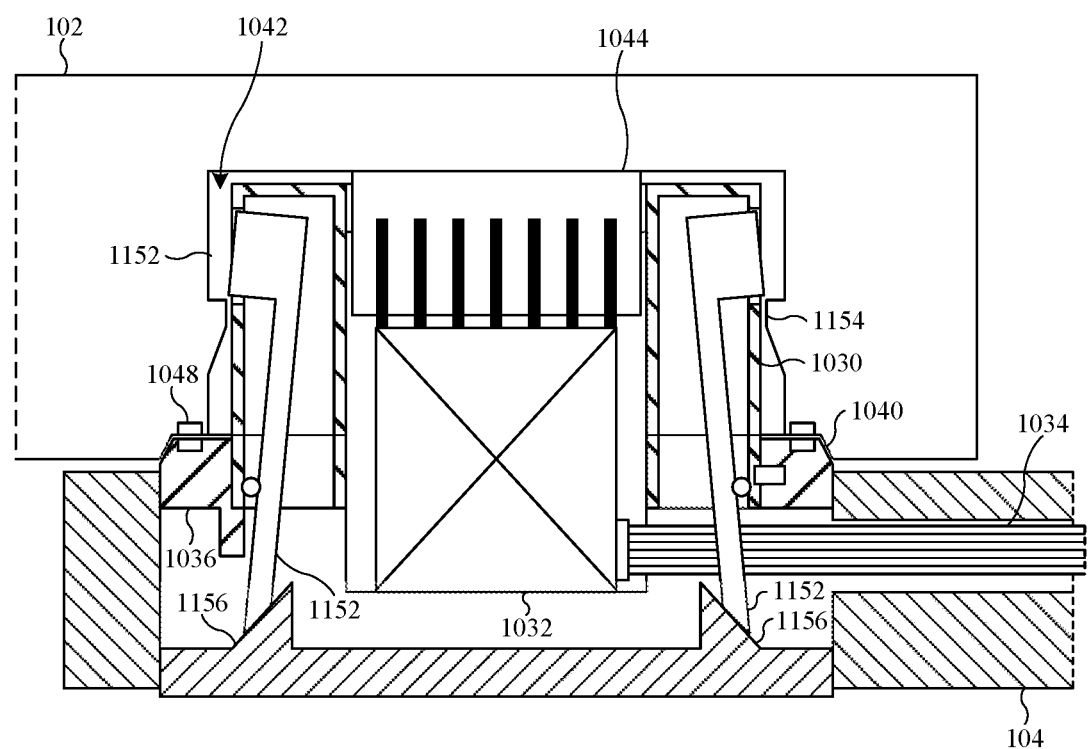
FIG. 13 is a cross-section view, taken along line A-A of FIG. 4, showing the first connector part and the second connector part in the connected position with the locking structure in an unlocked position.

FIG. 11 is a cross-section view, taken along line A-A of FIG. 4, showing the first connector part 112 and the second connector part 114 in the disconnected position. FIG. 12 is a cross-section view, taken along line A-A of FIG. 4, showing the first connector part 112 and the second connector part 114 in the connected position with a locking structure in a locked position. FIG. 13 is a cross-section view, taken along line A-A of FIG. 4, showing the first connector part 112 and the second connector part in the connected position with the locking structure in an unlocked position.

In the illustrated example, the locking structure is defined by locking levers 1152 that are connected to the connector body 1030. At least a portion of each of the locking levers 1152 extends outward from the connector body to allow engagement with the second connector part 114. For example, the locking levers 1152 may include engaging portions that extend laterally out of openings formed in the plug portion of the connector body 1030. The locking levers 1152 are configured to engage retaining features 1154 that are formed in the recess 1042 of the second connector part 114 (FIG. 12). The locking levers 1152 may flexible, may be connected to the connector body 1030 by pivot joints, and/or may be connected to the connector body by other suitable structures that allow movement of the engaging portions laterally, including lateral inward motion in response to external forces such as deflection by engagement with the retaining features 1154 during connection of the first connector part 112 to the second connector part 114.

The locking levers 1152 are movable between the locked position and the unlocked position. In the locked position (FIG. 12), the locking levers 1152 are engaged with the retaining features 1154 of the second connector part 114 to prevent disengagement of the connector body 1030 of the first connector part from the second connector part 114. In the unlocked position (FIG. 13) the locking levers 1152 do not prevent disengagement of the connector body 1030 from the second connector part 114.

As will be explained, the first connector part 112 includes a release mechanism that is configured to move the locking levers 1152 (or other locking structure) from the locked position to the unlocked position to release the first connector part 112 from the second connector part 114 and allow movement from the connected position to the disconnected position. The locking levers 1152 may be biased (e.g., by a spring) toward the locked position such that the locking levers 1152 only move to the unlocked position is upon operation of the release mechanism.

In the illustrated example, the release mechanism includes the release button 1038 and engaging features 1156 that are formed on the release button 1038. In the illustrated example, the engaging features 1156 are inclined, ramp-like surfaces that are formed on or connected to the release button 1038 and are moved by the release button 1038 so that, upon engagement with the locking levers 1152, the engaging features 1156 cause the locking levers 1152 to move, such as by pivoting. Thus, the engaging features 1156 are configured, upon operation of the release button 1038 by the user, to move the locking levers 1152 from the locked position to the unlocked position by axial motion of the release button 1038 and the engaging features 1156.

Thus, this implementation includes a release mechanism, defined by the release button 1038 and the engaging features 1156, that when operated moves the locking structure, defined by the locking levers 1152, from the locked position to the unlocked position.

Figure 14:
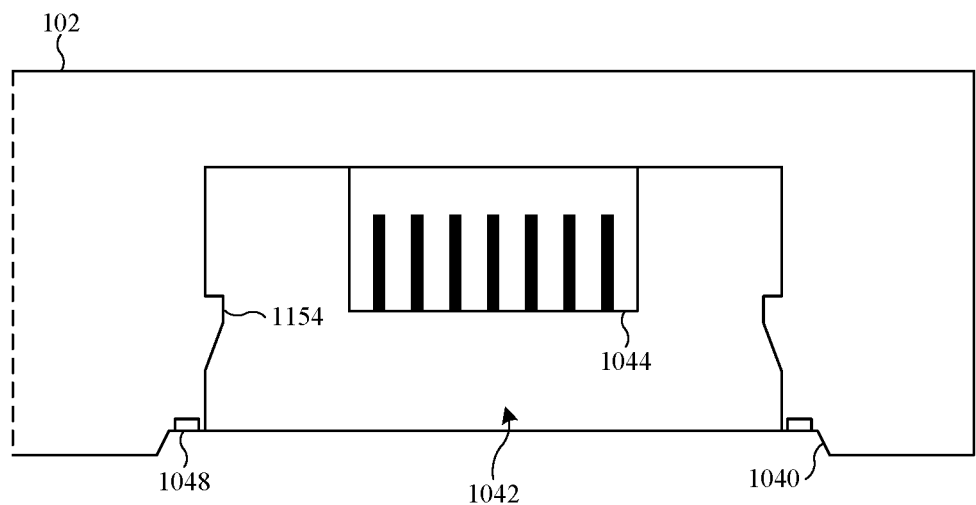
FIG. 14 is a cross-section view, taken along line A-A of FIG. 4, showing the first connector part and the second connector part in the disconnected position according to an alternative implementation.
Figure 14:
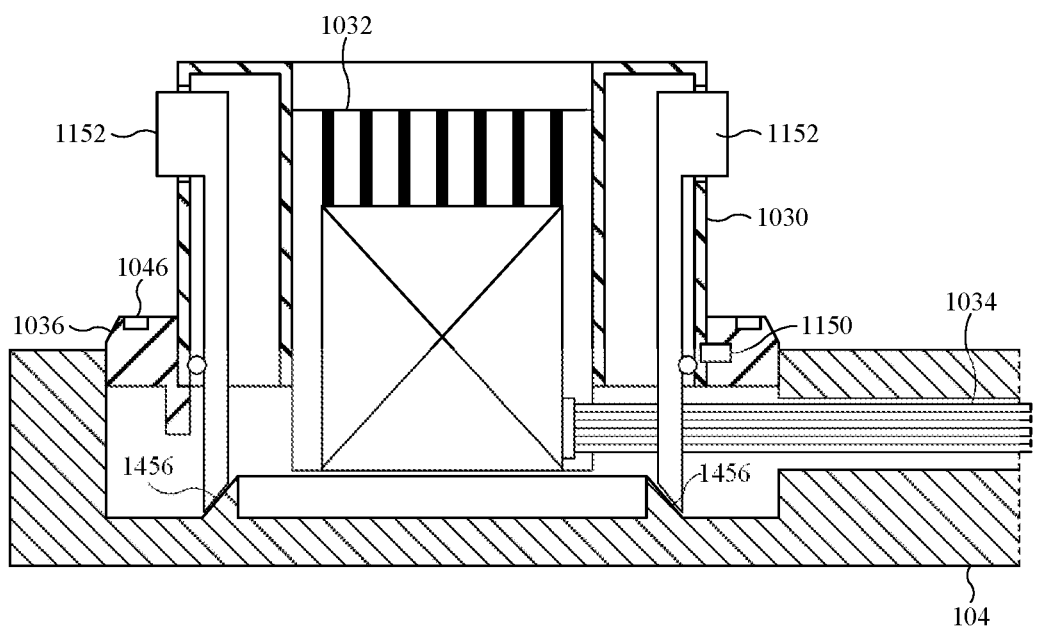
Figure 15:
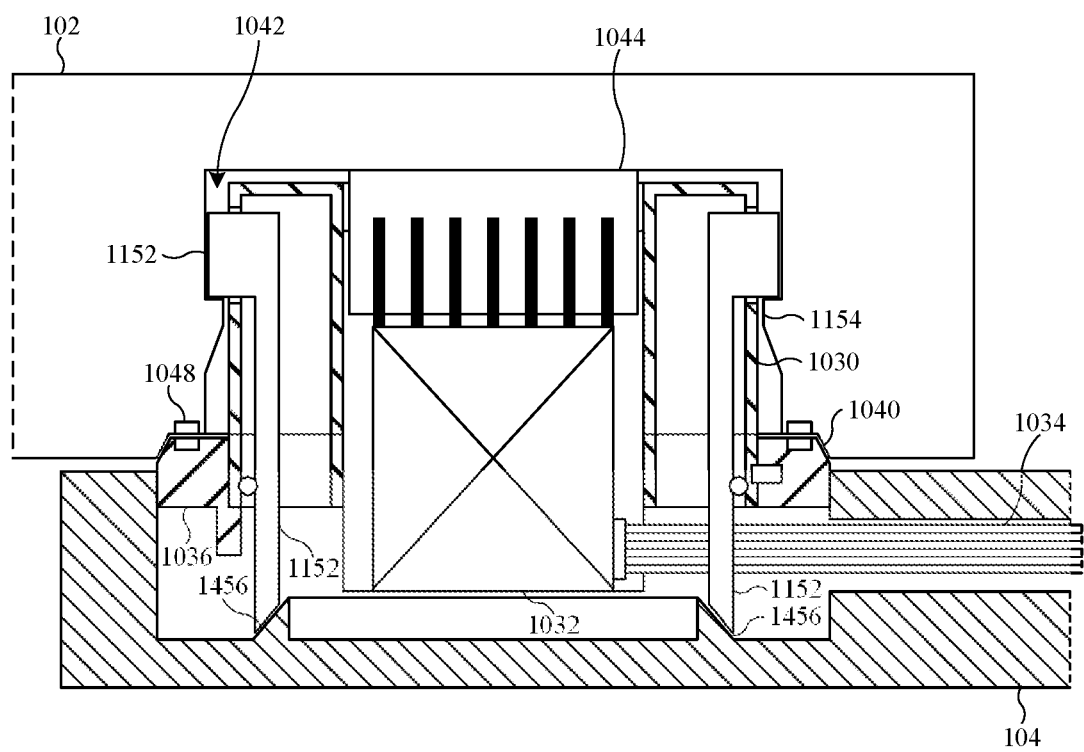
FIG. 15 is a cross-section view, taken along line A-A of FIG. 4, showing the first connector part and the second connector part in the connected position with a locking structure in a locked position according to the alternative implementation.
Figure 16:
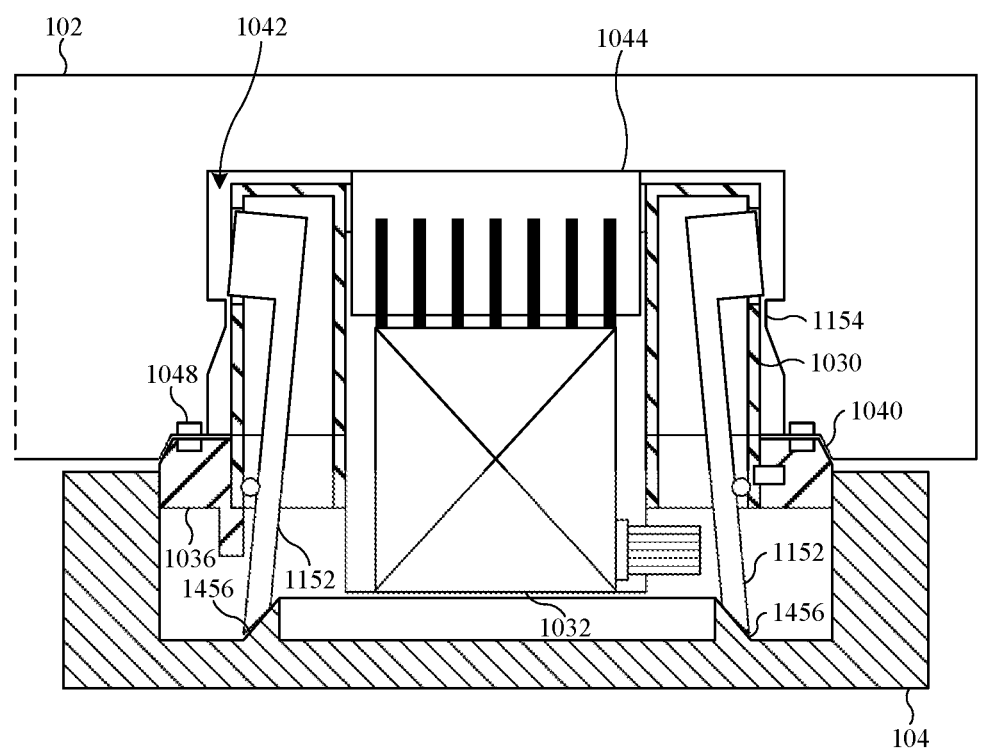
FIG. 16 is a cross-section view, taken along line A-A of FIG. 4, showing the first connector part and the second connector part in the connected position with the locking structure in an unlocked position according to the alternative implementation.

FIGS. 14-15 are directed to an alternative implementation in which a release mechanism unlocks the locking mechanism in response to rotation of the headband 104 with respect to the device housing 102. FIG. 14 is a cross-section view, taken along line A-A of FIG. 4, showing the first connector part 112 and the second connector part 114 in the disconnected position according to the alternative implementation. FIG. 15 is a cross-section view, taken along line A-A of FIG. 4, showing the first connector part 112 and the second connector part 114 in the connected position with a locking structure in a locked position according to the alternative implementation. FIG. 16 is a cross-section view, taken along line A-A of FIG. 4, showing the first connector part 112 and the second connector part in the connected position with the locking structure in an unlocked position according to the alternative implementation.

The implementation shown in FIGS. 14-16 is identical to the previously described implementation except that the release button 1038 is omitted and the engaging features 1156 are replaced by engaging features 1456. The engaging features 1456 may be formed on or connected to an interior surface of the headband 104. The engaging features 1456 include an inclined surface or surfaces that are engageable with the locking levers 1152. The engaging features 1456 are not movable axially as described with respect to the engaging features 1156. Instead, the engaging features are configured as a cam surface has a variable position, relative to the locking levers 1152, as the headband 104 is rotated. Thus, as the headband 104 is rotated, the release mechanism defined by the engaging features 1456 moves into engagement with the locking levers 1152 to move the locking levers 1152 from the locked position (FIG. 15) to the unlocked position (FIG. 16). Thus, the release mechanism, defined by the engaging features 1456, moves the locking structure, defined by the locking levers 1152, from the locked position to the unlocked position in response to rotation of the headband 104 with respect to the device housing 102, for example, upon rotation by a predetermined angle relative to a use position of the head-mounted device 100.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create three-dimensional or spatial audio environment that provides the perception of point audio sources in three-dimensional space. In another example, audio objects may enable audio transparency, which selectively incorporates ambient sounds from the physical environment with or without computer-generated audio. In some CGR environments, a person may sense and/or interact only with audio objects.

Examples of CGR Include Virtual Reality and Mixed Reality

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of Mixed Realities Include Augmented Reality and Augmented Virtuality

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources for use during operation of a head-mounted device. As an example, such data may identify the user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. As one example, a user profile may be established that stores fit and comfort related information that allows the head-mounted device to be actively adjusted for a user. As another example, a user profile may be selected based on information associated with the headband that is connected to the device housing (e.g., when each of multiple users has their own user-specific headband) and used to customize functionality of the device, such as a list applications or other information that is shown in a user interface. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of storing a user profile to adjustment of a head-mounted device, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, personalization related parameters may be determined each time the head-mounted device is used without subsequently storing the information or associating with the particular user.

What is claimed is:

1. A head-mounted device, comprising:
a device housing;
a headband that is configured to support the device housing with respect to a user;
a first connector part that is connected to the headband, wherein the first connector part includes a first electrical connector portion, the first connector part includes a connector body, the first electrical connector portion is fixed to the connector body, the first connector part includes a bearing ring, the bearing ring is fixed to the headband, and the bearing ring is rotatable with respect to the connector body to allow the headband to rotate with respect to the device housing; and
a second connector part that is connected to the device housing, wherein the second connector part includes a second electrical connector portion, wherein the first connector part and the second connector part are movable between a connected position, in which the first electrical connector portion is in engagement with the second electrical connector portion, and a disconnected position, in which the first connector part is spaced from the second connector part and the first electrical connector portion is not in engagement with the second electrical connector portion;
a locking structure that is movable between a locked position, in which the locking structure prevents movement from the connected position to the disconnected position and an unlocked position, in which the locking structure does not prevent movement from the disconnected position to the connected position; and
a release mechanism that, when operated, moves the locking structure from the locked position to the unlocked position,
wherein the headband is able to rotate with respect to the device housing in the connected position.

2. The head-mounted device of claim 1, wherein:
the connector body has a circular periphery that defines a peripheral surface, and
the bearing ring extends around the peripheral surface of the connector body.

3. The head-mounted device of claim 1, wherein:
the locking structure is connected to the connector body,
the locking structure is engaged with the second connector part to prevent disengagement of the connector body from the second connector part in the locked position, and
the locking structure does not prevent disengagement of the connector body from the second connector part in the unlocked position.

4. The head-mounted device of claim 3, wherein the release mechanism includes a release button that, when operated, moves the locking structure from the locked position to the unlocked position.

5. The head-mounted device of claim 3, wherein the release mechanism moves the locking structure from the locked position to the unlocked position in response to rotation of the headband with respect to the device housing.

6. The head-mounted device of claim 5, wherein the release mechanism moves to the unlocked position from the locked position upon rotation of the headband by a predetermined angle relative to a use position.

7. A head-mounted device, comprising:
a device housing;
a headband that is configured to support the device housing with respect to a user;
a first connector part that is connected to the headband, wherein the first connector part includes a first electrical connector portion; and
a second connector part that is connected to the device housing, wherein the second connector part includes a second electrical connector portion, wherein the first connector part and the second connector part are movable between a connected position, in which the first electrical connector portion is in engagement with the second electrical connector portion, and a disconnected position, in which the first connector part is spaced from the second connector part and the first electrical connector portion is not in engagement with the second electrical connector portion;
a locking structure that is movable between a locked position, in which the locking structure prevents movement from the connected position to the disconnected position and an unlocked position, in which the locking structure does not prevent movement from the disconnected position to the connected position; and
a release mechanism that, when operated, moves the locking structure from the locked position to the unlocked position,
wherein the headband is able to rotate with respect to the device housing in the connected position, and
wherein the first connector part includes a rotating joint that allows rotation of the first electrical connector portion with respect to the headband.

8. The head-mounted device of claim 7, wherein the rotating joint includes a detent that corresponds to a use position and resists rotation away from the use position.

9. A head-mounted device, comprising:
a device housing;
a headband that is configured to support the device housing with respect to a user;
a first connector part that is connected to the headband, wherein the first connector part includes a first electrical connector portion; and
a second connector part that is connected to the device housing, wherein the second connector part includes a second electrical connector portion, wherein the first connector part and the second connector part are movable between a connected position, in which the first electrical connector portion is in engagement with the second electrical connector portion, and a disconnected position, in which the first connector part is spaced from the second connector part and the first electrical connector portion is not in engagement with the second electrical connector portion;
a locking structure that is movable between a locked position, in which the locking structure prevents movement from the connected position to the disconnected position and an unlocked position, in which the locking structure does not prevent movement from the disconnected position to the connected position; and
a release mechanism that, when operated, moves the locking structure from the locked position to the unlocked position,
wherein the headband is able to rotate with respect to the device housing in the connected position, and
wherein the first connector part includes first magnetic components, the second connector part includes second magnetic components, and magnetic attraction between the first magnetic components and the second magnetic components urges the first connector part toward engagement with the second connector part.

10. The head-mounted device of claim 1, wherein the first connector part includes first magnetic components, the second connector part includes second magnetic components, and magnetic attraction between the first magnetic components and the second magnetic components urges the first connector part toward a predetermined angular orientation of the headband relative to the device housing.

11. The head-mounted device of claim 1, further comprising:
a display device that is connected to the device housing and generates emitted light to display content; and
optical components that are associated with the display device to direct the emitted light to eyes of the user.

12. A head-mounted device, comprising:
a device housing;
a headband that is configured to support the device housing with respect to a user;
a first connector part that is connected to the headband, wherein the first connector part includes a mechanical connector portion and a rotating joint, wherein the mechanical connector portion is connected to the headband by the rotating joint so that the headband is able to rotate with respect to the mechanical connector portion of the first connector part; and
a second connector part that is connected to the device housing,
wherein the first connector part and the second connector part are movable between a connected position and a disconnected position,
wherein the rotating joint allows the headband to rotate with respect to the device housing in the connected position, and the rotating joint includes a detent that corresponds to a use position and resists rotation away from the use position,
the first connector part includes a first electrical connector portion that is connected to the mechanical connector portion,
the second connector part includes a second electrical connector portion, and
the first electrical connector portion is engaged with the second electrical connector portion in the connected position to establish an electrical connection between the first electrical connector portion and the second electrical connector portion.

13. The head-mounted device of claim 12, wherein:
the mechanical connector portion of the first connector part is in engagement with the second connector part in the connected position, and
the mechanical connector portion of the first connector part is not in engagement with the second connector part in the disconnected position.

14. The head-mounted device of claim 12, wherein:
the mechanical connector portion of the first connector part is not rotatable with respect to the second connector part in the connected position,
the headband is rotatable with respect to the device housing in the connected position, and
the second connector part is not rotatable with respect to the device housing.

15. A head-mounted device, comprising:
a device housing;
a headband that is configured to support the device housing with respect to a user;
a first connector part that is connected to the headband and includes first magnetic components; and
a second connector part that is connected to the device housing and includes second magnetic components,
wherein the first connector part and the second connector part are movable from a disconnected position to a connected position to define a rotatable connection between the device housing and the headband in the connected position, and
wherein magnetic attraction between the first magnetic components and the second magnetic components urges the first connector part toward a predetermined angular orientation of the headband relative to the device housing.

16. The head-mounted device of claim 15, wherein:
the first connector part includes a first electrical connector portion,
the second connector part includes a second electrical connector portion, and
the first electrical connector portion is engaged with the second electrical connector portion in the connected position to establish an electrical connection between the first electrical connector portion and the second electrical connector portion.

17. The head-mounted device of claim 15, wherein:
the first connector part includes a locking structure,
the locking structure is movable between a locked position and an unlocked position,
the locking structure is engaged with the second connector part to prevent disengagement of the first connector part from the second connector part in the locked position, and
the locking structure does not prevent disengagement of the first connector part from the second connector part in the unlocked position.

18. The head-mounted device of claim 17, wherein the first connector part includes a release mechanism that, when operated, moves the locking structure from the locked position to the unlocked position.

19. A head-mounted device, comprising:
a device housing;
a headband that is configured to support the device housing with respect to a user;
a first connector part that is connected to the headband;
a second connector part that is connected to the device housing;
a locking structure that is movable between a locked position and an unlocked position to prevent disengagement of the first connector part and the second connector part in the locked position, and to allow disengagement of the connector body from the second connector part in the unlocked position; and a release mechanism that moves the locking structure from the locked position to the unlocked position in response to rotation of the headband with respect to the device housing.

20. The head-mounted device of claim 19, wherein the release mechanism moves to the unlocked position from the locked position upon rotation of the headband by a predetermined angle relative to a use position.

21. The head-mounted device of claim 19, wherein:
the first connector part includes a first electrical connector portion,
the second connector part includes a second electrical connector portion, and
the first electrical connector portion is engaged with the second electrical connector portion in the connected position to establish an electrical connection between the first electrical connector portion and the second electrical connector portion.

\* \* \* \* \*